United States Patent [19]
Braun

[11] Patent Number: 5,586,890
[45] Date of Patent: Dec. 24, 1996

[54] CONTACTING APPARATUS FOR A CHIPCARD

[75] Inventor: Gerhard Braun, Erlenbach, Germany

[73] Assignee: Amphenol-Tuchel Electronics GmbH, Germany

[21] Appl. No.: 284,660

[22] PCT Filed: Dec. 20, 1993

[86] PCT No.: PCT/EP93/03618

§ 371 Date: Nov. 7, 1994

§ 102(e) Date: Nov. 7, 1994

[87] PCT Pub. No.: WO94/15313

PCT Pub. Date: Jul. 7, 1994

[30] Foreign Application Priority Data

Dec. 18, 1992 [DE] Germany ............... 42 43 076.3

[51] Int. Cl.⁶ .................................................. H01R 9/09
[52] U.S. Cl. .................................................. 439/66; 439/630
[58] Field of Search ............................ 439/65–72, 630

[56] References Cited

U.S. PATENT DOCUMENTS

| | | | |
|---|---|---|---|
| 4,976,640 | 12/1990 | Schuder et al. | 439/260 |
| 5,012,078 | 4/1991 | Pernet | 235/441 |
| 5,152,694 | 10/1992 | Bargain | 439/66 |
| 5,259,777 | 11/1993 | Schuder et al. | 439/188 |
| 5,269,707 | 12/1993 | Reichardt et al. | 439/630 |
| 5,320,552 | 6/1994 | Reichardt et al. | 439/311 |
| 5,427,535 | 6/1995 | Sinclair | 439/66 |

FOREIGN PATENT DOCUMENTS

| | | | |
|---|---|---|---|
| 0402504 | 12/1990 | European Pat. Off. | G06K 7/06 |
| 0444396 | 2/1991 | European Pat. Off. | G06K 7/06 |
| 4008655 | 8/1991 | Germany | G06K 7/015 |
| 4029576 | 3/1992 | Germany | G06K 7/015 |
| 4030196 | 3/1992 | Germany | G06K 7/015 |
| 4118312 | 12/1992 | Germany | G06K 7/06 |
| WO92/04688 | 3/1992 | WIPO | G06K 7/06 |
| WO92/05513 | 4/1992 | WIPO | G06K 7/06 |

*Primary Examiner*—P. Austin Bradley
*Assistant Examiner*—Jill DeMello
*Attorney, Agent, or Firm*—Bacon & Thomas

[57] ABSTRACT

An apparatus for establishing electrical connection between a printed circuit board and a chipcard such as a SIM-card includes: a support for carrying a plurality of contacts for carrying electrical signals between the printed circuit board and the SIM-card; a housing onto which is attached on a bottom side thereof the SIM-card; and a guide means, mounted on the housing independently of the support and arranged so as to be spaced from the support, for guiding the SIM card onto the support. The dimensions of the support are arranged to be smaller than the dimensions of the SIM card so as to increase the available space on the surface of the printed circuit board.

32 Claims, 3 Drawing Sheets

5,586,890

CONTACTING APPARATUS FOR A CHIPCARD

BACKGROUND OF THE INVENTION

1. Technical Field of the Invention

The invention relates to a contacting apparatus for a chipcard. The invention relates specifically to a contacting apparatus for a SIM-card. As it is well known, SIM-cards are a special kind of chipcards which are smaller than the conventional chipcards. For instance, the SIM-cards contain information about the subscriber of a telephone company. It is for that reason that such cards are called SIM-cards with the prefix "SIM" having the meaning of "subscriber identity module".

2. Description of the Prior Art

Regarding contacting apparatus attention is drawn to German published patent applications DE 41 18 312 A1, DE 40 08 655 A1 and DE 40 30 196 A1.

The known contacting apparatus, specifically the contacting apparatus for SIM-cards have larger dimensions than the SIM-card itself primarily due to the fact that card guide means are provided. Customarily, the SIM-card has a size of 25 mm×15 mm. Thus, the guide means require space which might be necessary for other purposes. This is particularly true in a situation where the contacting apparatus has to be placed on a circuit board. In such a situation space, which otherwise could be used by other components is wasted. Such a situation might specifically cause a problem in the area of the so-called surface mounted technology (SMT). Another problem is the heating-up of the contacting apparatus; this is a particular problem due to the fact that the contact elements of the contacting apparatus need to find support in the contact support.

Another disadvantage of the contact apparatus of the prior art is that it is generally necessary to use a mechanical lowering means so as to achieve high cycle numbers for plugging (the card into the contacting apparatus, and for removing it). If no mechanical lowering means is used, then after a few thousand cycles the noble metal layers galvanized onto the slide contacts will be worn down to the base material.

SUMMARY OF THE INVENTION

It is an object of the present invention to overcome the disadvantages of the prior art. The present invention specifically intends to provide a contacting apparatus which has extremely small outer dimensions and can be preferably used together with other SMT-components. Further, also though a smaller and thinner design is used, even under conditions of heat a stable design should be obtained.

It is another object of the invention to provide a contacting apparatus which achieves a high number of plugging cycles together with good operating characteristics.

In accordance with a first aspect of the present invention, the contacting apparatus comprises a contact support having small outer dimensions. Said contact support can preferably be designed as a purely SMT-component providing specifically only the function of making contact but not providing the function of guiding the SIM-card. Preferably, the means for guiding the SIM-card are spaced with respect to the contact support and are arranged at a different component of the contacting apparatus, for instance at a housing of the contacting apparatus.

Due to the fact that the means necessary for guiding the card are not provided at the bottom of the contact support but, for instance, on the top of the housing, the circuit board can be equipped with SMT components below the guide means for the chipcard.

It should be noted in this context that it is also considered to be feasible to arrange the guide means not at the bottom of the contact support but on top of the contact support such that there is space provided below the guide means for certain SMT-components to be placed on the circuit board on which the contact support is mounted.

In a accordance with a second aspect of the present invention, a contacting apparatus for a chipcard is provided which does not require a mechanical lowering means but achieves a high number of plug cycles by providing the following: a noble metal layer is provided on the contact cusps of the contact elements of the contacting apparatus, said noble metal layers being plated thereon by a mechanical/physical process for instance by roller plating. With this arrangement at least 10 000 plug cycles can be reached without wearing down the noble metal if for frictional pairs of metal-plastic/metal are present.

In accordance with the invention preferably both the above aspects are used simultaneously.

In accordance with a particularly preferred embodiment of the invention, the contact support is made of plastic material which is for instance made by injection molding with metal inserts being used to provide an integrated reinforcement of the plastic material. Preferably, the metal inserts provide for an additional soldering base. In this manner rocking of the contact support during the soldering process is avoided also in a situation where contact terminations are located only on one side and in one row; further a reduction of the outer dimensions of the contact support below the dimensions of the SIM-card is possible. In accordance with the invention the contact terminations are located on the one narrow side of the contact support and the soldering base point is located on the oppositely located other narrow side of the contact support.

The significant reduction of the outer dimensions of the contact support in accordance with the invention leads to a weakening of the contact support and this might lead to problems in connection with the heat load (during the soldering process) and with regard to the long term characteristics (relaxation of the plastic material). The frame located in accordance with the preferred embodiment of the invention within the contact support and being made of metal counteracts both said problems. Moreover, the metal frame allows the formation of one (or a plurality) of soldering base points without requiring an additional part to be inserted.

In accordance with a preferred embodiment of the invention the portion of the contact support which comprises contact cusps extends inclined with respect to that part of the contact support within which the termination ends of the contact elements are provided.

In accordance with a third aspect of the invention a contacting apparatus for a card of authorization, specifically a chipcard is provided such that said contacting apparatus is adapted to be automatically provided with components and, on the other hand, a protection is provided for the electronic means of the apparatus within which the card is used so as to provide protection against dirt and dust. If, for instance, the chipcard is intended to be used together with a telephone housing then the insertion as well as the withdrawal of the card of authorization (for instance a chipcard or a SIM-card)

has to be possible without subjecting the electronic means located in the telephone housing to dirt or wetness. The contacting apparatus of the invention is designed such that the contacts or contact elements are led to the outside in a sealed manner. Said sealing of the electronic means will be achieved without any additional components. It is possible to achieve a minimum size. For instance, the contacting apparatus of the invention comprises an upper circumferential margin (collar) to provide a sealing effect between the housing and the contacting apparatus. Moreover, for instance the contacting apparatus comprises a continuous circumferential plane support surface so as to provide a sealing effect with respect to a printed circuit board.

In accordance with the third aspect of the invention a box-like part extends away from the collar and forms at its free end said plane support surface for providing a sealing effect with respect to the printed circuit board onto which the contacting apparatus can be placed. Preferably the termination ends of the contact elements, which are injection molded into the contacting apparatus, extend preferably in the respective wall portions of said box-like part (box).

Further advantages, objects and details of the invention can be realized from the following description of embodiments of the invention shown drawing; in the

BRIEF DESCRIPTION OF THE FIGURES OF DRAWING

DETAILED DESCRIPTION OF THE PREFERRED EMBODIMENT

Figure 1:
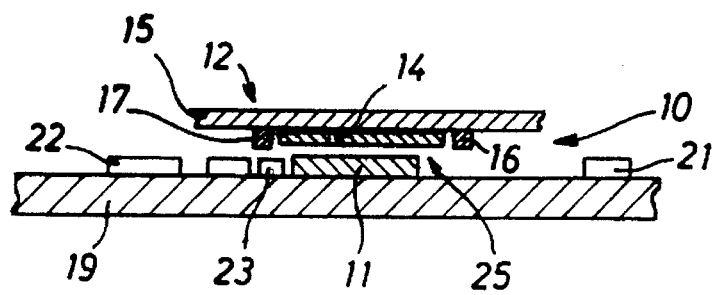
FIG. 1 is a schematic sectional view of a contact support of the invention arranged on a base plate in the form of a printed circuit board.

FIG. 1 represents a contacting apparatus 10 of the invention, which is comprised of a contact support 11 as well as card guide means 12 for a chipcard, preferably a SIM-card 14.

The contact support 11 is preferably adapted to be arranged on a base plate 19, which is preferably a printed circuit board and is, indeed, in particular, a printed circuit board adapted for the surface mounted technology (SMT).

As can be seen in FIG. 1 the guide means 12 for the SIM-card 14 are not formed by the contact support 11 but are provided separately, preferably spaced with respect to said contact support 11. In the embodiment shown, the card guide means 12 are formed by two guide rails 16, 17 which are arranged at the bottom side of a plate or a housing 15. By means of said guide means 12 the SIM-card 14 is spaced with respect to the contact support 11 such that good contact takes place.

As can be seen in some detail in FIG. 1, on the upper surface of the SMT-circuit board 19 additional SMT-components 21, 22 and 23 are arranged. Due to the fact that the guide means 12 are upwardly spaced with respect to the contact support 11, additional space 25 results on both sides of the contact support 11; said additional space 25 is used in the shown embodiment, for instance, for a SMT-component 23.

Figure 2:
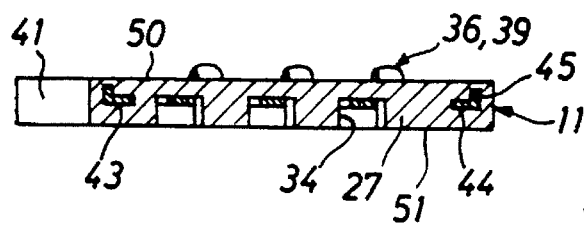
FIG. 2 is a sectional view along line A–B in FIG. 3.
Figure 3:
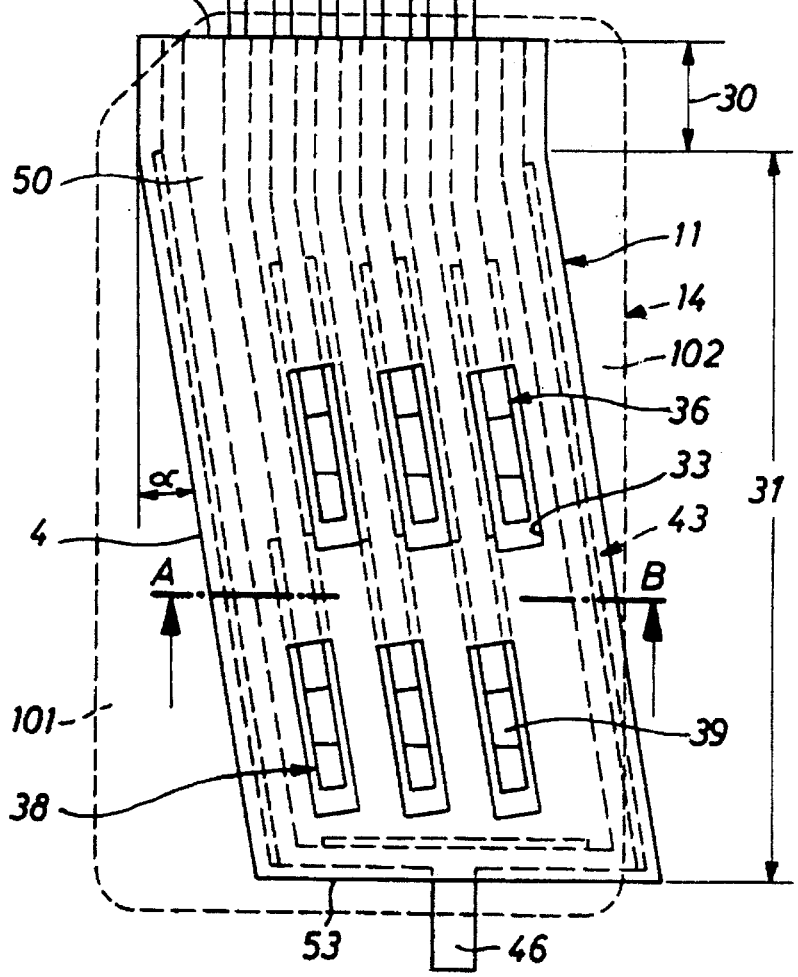
FIG. 3 is top plan view of the contact support of FIG. 2.

As can be recognized in FIGS. 2 and 3 the contact support 11 is preferably a single piece body or element 27 which is preferably formed of plastic material. The body 27 has two sections, a first section 30 in the form of a rectangle and a second section 31 in the form of a parallelogramm, said first and second sections being integral. Due to said design a significant amount of space is saved inasmuch as the dimensions of the contact support are smaller than the dimensions of the SIM-card 14, as can be seen in the dashed outline in FIG. 3. The body 27 of the contact support is not much wider than the widthwise arrangement of the contact elements 36. As shown, in the upper surface 50 of the contact support 11 parallel slots 33 are provided which are offset and which continue in recesses 34 at the bottom side 51 of the contact support. The length of the recesses 34 is selected such that the contact elements 36 which have the form of contact springs and which end in said slots 36, can provide a sufficient contacting force. Preferably, the contact elements 36 are biased.

The contact elements 36 comprise termination ends 37 which project from the one narrow side 52 of the contact support 11. Preferably, the contact elements 36 are mounted in the contact support 11 during injection molding of the plastic material. Opposite to the termination ends 37 the contact elements 36 are provided with contact ends 38 which form contact cusps 39 which project beyond the upper surface 50 of the contact support 11 if no chipcard is present (see FIG. 2). The above mentioned section 31 having the form of a parallelogramm is inclined with respect to the rectangular section 30 by an angle of ca. 30°. Thus, on the one side of the contact support 11 (as is shown in FIG. 2) an inclined surface 41 is formed. As a consequence, two generally rectangularly-shaped free spaces are formed with respect to the circumference of the SIM-card 14 as is shown in FIG. 3; said free spaces are referred to by reference numerals 101 and 102 and they can be used for instance for SMD-components. Thus, the guide portions for the SIM-card are preferably separated from the contact support.

Preferably, in the contact support 11 a frame 43 made of metal is arranged which preferably extends substantially parallel to the longitudinal sides and to one of the narrow sides, i.e. narrow side 52 which is opposite to narrow side 53 of the contact support 11. The generally U-shaped metal frame 43 has a cross section preferably in the form of an "L", thus forming a horizontal portion 44 and a leg 45 (FIG. 2). Further, the frame 43 forms preferably a soldering base point 46 which projects centrally from the narrow side 53. The legs 45 extend substantially parallel to the outer edges of the contact support 11. The use of a frame 43 increases mechanical and thermal stability and affords a small design including a small thickness of the contact support.

Figure 4:
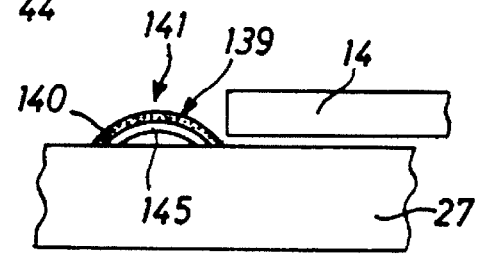
FIG. 4 is a schematic side elevational view of a preferred embodiment of a contact element which is especially suitable for use in a contact element of the contact support of the invention.

FIG. 4 discloses another aspect of the invention, that the contact springs, represented by a contact spring 141, are preferably provided with a roller plated layer 140 of noble metal, preferably at least in the area of the contact cusps 139. Said layer 140 of noble metal can also be applied to the base material 145 of the contact spring 141 in any other mechanical/physical manner. Said layer 140 provides for a high plug cycle number which is advantageous because the contacting apparatus 10 of the invention operates without a mechanical lowering means.

FIGS. 5 through 8 show another embodiment of a contacting apparatus 201, in accordance with a third aspect of the invention. The contacting apparatus 201 is preferably of a single piece design and of plastic material, and it is preferably injection molded. The contacting apparatus 201 comprises three sections or parts, (see FIG. 5, going from the top towards the bottom) a recessed part also called insert part 209, a margin or collar part 207 and a box part (box means) 253. The box part 253 is preferably formed by four side walls 203, 204, 205 and 206. The box part 253 provides the contacting apparatus with a rigid, stable design and thus allows that the box part 253 forms at its free end a continuous circumferential planar support or a sealing surface 250 so as to provide for a secure mounting of a circuit board 222 (see FIG. 6).

The collar portion 207 also serves to reinforce the contacting apparatus and thus increases its stability.

Figure 6:
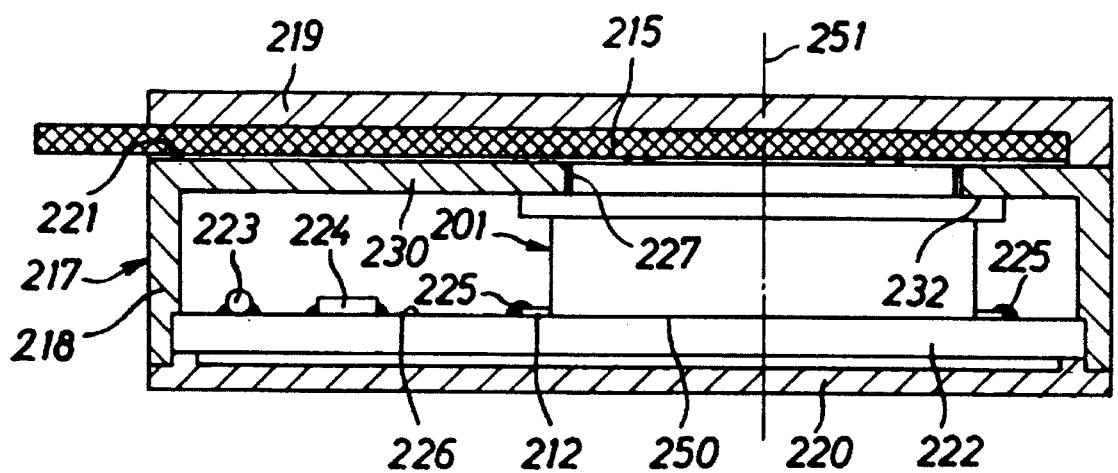
FIG. 6 is a sectional view of an apparatus for instance a telephone set within which the contacting apparatus of FIG. 5 has been used.

The collar portion 207, which extends with respect to the insert portion 209 radially outward (i.e. perpendicular to the longitudinal axis 251), forms a support surface 208. The support surface 208 can be sealingly mounted to a housing 217, for instance a housing of a telephone set, as is shown in FIG. 6; said mounting could, for instance, be carried out by an adhesive. Similarly, the above mentioned sealing surface 250 can be glued (mounted by means of an adhesive) to the printed circuit board 222, wherein a suction surface 243 provided on the upper surface 213 of the contacting apparatus 201 simplifies the suctional gripping of the contacting apparatus 201 during assembly.

In the shown embodiment, the collar portion 207 extends with its outer circumference beyond the circumference of the box part 253, a fact which is not necessary but desirable to save space. The length L3 of the box portion 253 is, in the direction of the longitudinal axis 251 (see FIG. 7) preferably at least equal to the entire thickness L1+L2 of the upper wall 202, preferably, however, larger.

Following the above overview, FIG. 6 will now be described in some detail. FIG. 6 shows the housing 217 in a cross sectional view. The housing comprises a frame 218, a cover 219, a bottom 220 and an intermediate wall 230. Between the cover 219 and the intermediate wall 230 a receiving slot 221 for an authorization card 215 preferably a chip card or a SIM-card is provided. In the lower area of the housing 217 the circuit board 222 is mounted. On the upper surface of the circuit board 222 components, preferably SMT-components 223 and 224 are provided and the termination ends 212 of the contact elements 210 of the contacting apparatus 201 are soldered as is shown by solder 225. The contacting apparatus 201 is preferably glued to the upper surface 226 of the circuit board by means of its support or sealing surface 250, for instance by using an adhesive. In this manner a perfect seal is obtained between the circumferentially extending planar sealing surface 250 and the upper surface 226 of the circuit board 222.

The sealing with respect to the electronic, i.e. the components 223, 224 and other components is further achieved by sealingly glueing the support or sealing surface 208 for instance to the bottom side 232 of the intermediate wall 230, preferably in the area of the support surface 208. The insert portion 209 is preferably located, as is shown in FIG. 6, in a recess 227 of the intermediate wall 230. Even if the chipcard 215 is not located in the receiving slot 221 a perfect seal is achieved for the electronic with respect to the environment. Inasmuch as the collar portion 207 completely surrounds the contacting apparatus 201 (see FIG. 8) due to the surfaces 232 and 208 being glued together, a complete sealing effect is achieved. In addition, the space shown in FIG. 6 between the insert portion 209 and the recess 207 could be glued or, alternatively, filled with a binder.

In the embodiment shown the contacting apparatus 201 does not comprise guide means for the chipcard 215. The upper surface 213 is located on the same plane as an upper surface of the intermediate wall 230; said upper surface of the wall 230 forms the lower limit of the receiving slot 221.

Figure 5:
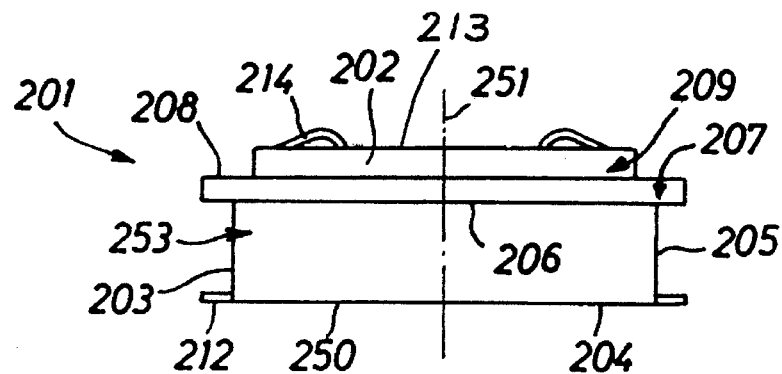
FIG. 5 is a sectional view of another embodiment of a contacting apparatus.
Figure 7:
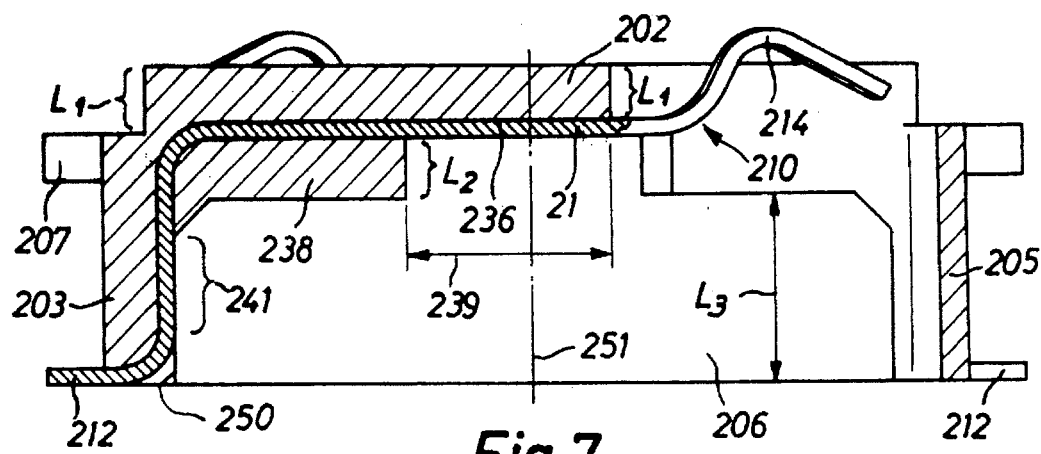
FIG. 7 is a sectional view along line A—A in FIG. 8.
Figure 8:
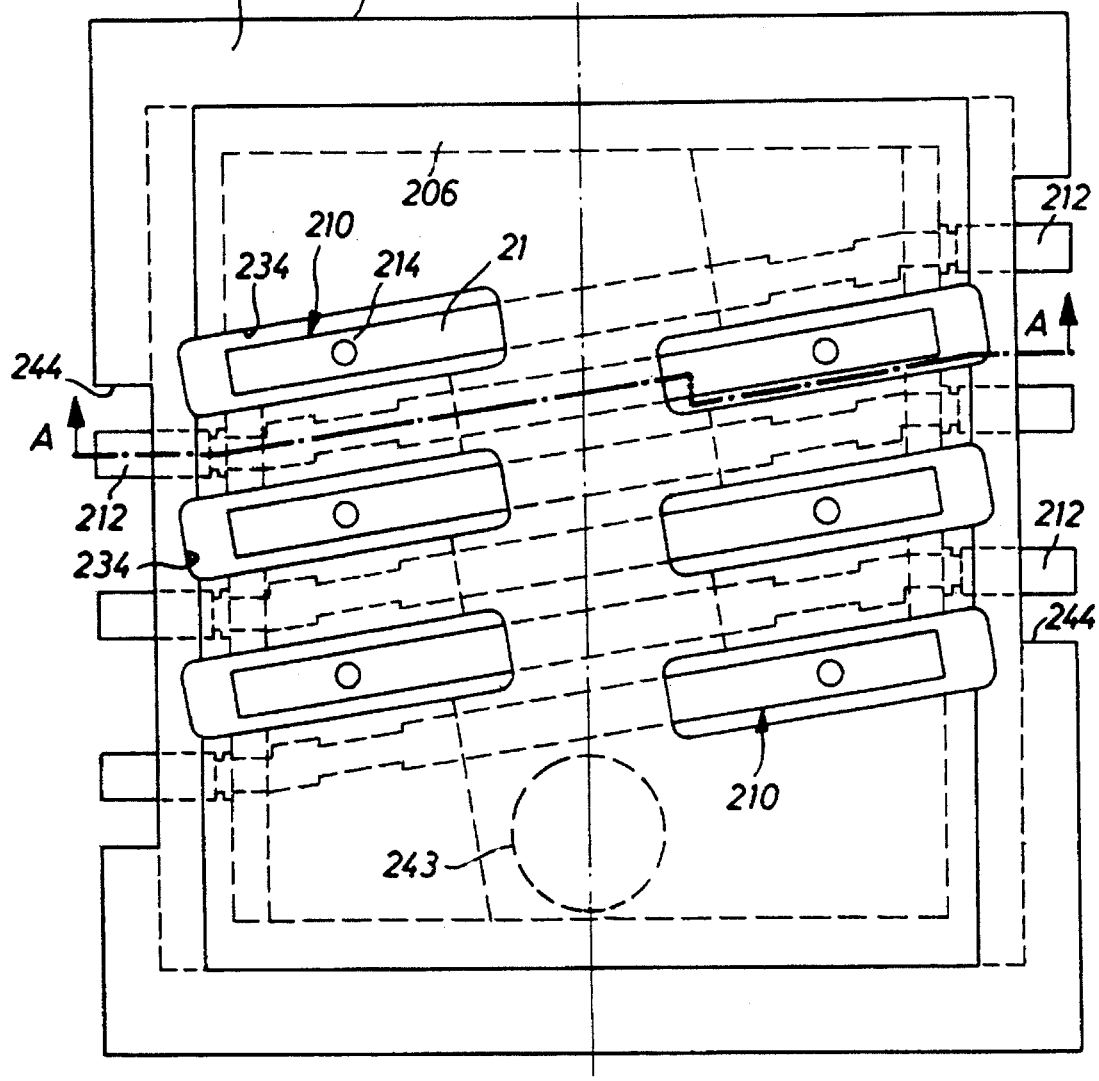
FIG. 8 is an enlarged plan view of the contacting apparatus of FIG. 5.

The contacting apparatus 201 comprises the already briefly mentioned contact elements 210 (FIGS. 7 and 8). Of said elements 210, FIGS. 5 and 6 show only the contact cusps 214 as well as the termination ends 212. In FIGS. 7 and 8 the contact elements 210 are shown in detail and it can be recognized that the contact elements form, besides the termination ends 212, also the contact ends 211 which in turn form the already mentioned cusps 214. The contact elements 210 are preferably injection molded into the contacting apparatus 201, as is shown in FIG. 7; a horizontal portion of the contact elements extends in the upper wall 202 and a perpendicular portion extends in the sidewalls of the box 253 in the two oppositely-located sidewalls 203, 205. Thus, the stability of the contacting apparatus 201 is further improved.

The horizontal portion of the contact elements 210 is not completely surrounded by the injection-molded material but a free space 239 is formed by recessing the otherwise present wall thickness Li+L2 of the upper wall 202, for instance in the amount of L1. Thus, it is achieved that the contact spring 210 is biased against the free bottom surface 236 of the upper wall in the rest position. If an acuation by means of the chipcard 215 occurs, then the contact element 210 is resiliently pushed away from the surface 236. The contact elements 210 which are injection molded into the sidewalls 203, 205 of the box portion 251 can be free or uncovered in an area 241 (FIG. 7). They are, however, again injection molded towards the sealing surface 250 wherefrom then the contact elements extend outwardly preferably perpendicular to the longitudinal axis 251. In the area of the termination ends 212 the collar portion has a reduced width due to the cut-outs or recesses 244 (FIG. 8); however, the reduced width is sufficient for an appropriate amount of sealing effect.

As can be gathered from FIG. 8 the slots 234 provided in the upper wall 202 for the contact elements 210 extend in a slightly inclined manner, as is true for the respective contact elements.

I claim:

1. An apparatus for establishing electrical connection between a chipcard and a printed circuit board, said apparatus comprising:

means, arranged on said circuit board, for contacting said chipcard, said means including a support containing a plurality of contact elements for facilitating electrical contact between said contact elements and said chipcard, said support performing the function of supporting said contact elements in a manner that will increase the available space on said printed circuit board and wherein said support has a width which is narrower than the width of the chip card and said support further comprises a parallelogram-shaped section and a rectangular-shaped section wherein the sides of the support in the parallelogram-shaped section are inclined with respect to the sides of the support in the rectangular section; and guide means, spaced from the support, for guiding the chipcard onto the support.

2. The apparatus recited in claim 1, wherein the printed circuit board is an SMT-component board.

3. The apparatus recited in claim 1, wherein the support includes two sections, a first section having substantially the shape of a rectangle and a second section having substantially the shape of a parallelogram.

4. The apparatus recited in claim 1, wherein the contact elements are provided with ends which form contact cusps, said ends being coated with a layer of a noble metal.

5. The apparatus recited in claim 1, wherein the support comprises slots and recesses adapted to receive the contact elements.

6. The apparatus recited in claim 1, wherein said support has a width which is narrower than a width of the chipcard, said contact support tapering like a wedge on opposite sides.

7. The apparatus recited in claim 1, wherein the support has dimensions which are smaller than dimensions of the chipcard.

8. The apparatus recited in claim 1, wherein said chipcard is a SIM card.

9. The apparatus recited in claim 1, further comprising:

a housing, disposed above said support, onto which is arranged on a bottom side thereof the chipcard; and wherein the guide means are mounted on the housing independently of the support.

10. The apparatus recited in claim 9, further comprising:

a reinforcement means formed integrally with said support for increasing mechanical and thermal stability of said support, said reinforcement means being formed by metal inserts.

11. The apparatus recited in claim 9, further comprising:

a collar, extending about the contacting apparatus, for providing sealing between the housing and the contacting apparatus, and a continuous planar support provided at an axial end of the contacting apparatus which is opposite to an end of the contacting apparatus where the contact elements protrude for contacting the chipcard, said planar support forming a seal between the contacting apparatus and said printed circuit board.

12. The apparatus recited in claim 1, wherein the support is made of a plastic material and comprises a metal frame which extends adjacent to and is embedded in side edges of the support.

13. The apparatus recited in claim 12, wherein the frame is generally U-shaped.

14. The apparatus recited in claim 12, wherein said frame forms a soldering base point at a first narrow side of the support.

15. The apparatus recited in claim 14, wherein the contact elements have termination ends which protrude from a second narrow side of the support.

16. The apparatus recited in claim 15, wherein the second narrow side of the support where the termination ends protrude is offset with respect to the first narrow side where the soldering base point protrudes.

17. The apparatus recited in claim 15, wherein the termination ends and the soldering base points are designed to be compatible with a printed circuit board selected from one of the group comprising surface mounted technology and plug-in technology.

18. An apparatus for establishing electrical connection between a chipcard and a printed circuit board, said apparatus comprising:

a) a body made of plastic material, said body comprising:
an insert portion having an upper surface,
a collar portion having a support surface, and
a box portion having a free end and a plurality of sidewalls which extend parallel to a longitudinal axis passing through said collar portion, box portion, and insert portion, said sidewalls extending upwardly to a length equal to or larger than a thickness of the upper surface of the insert portion; and b) a plurality of contact elements supported by said body, said contact elements having contact ends which extend beyond the upper surface of the insert portion and termination ends which are guided out of the free end of the box portion, said free end forming a surface which is adapted to be sealingly mounted on the printed circuit board.

19. The apparatus recited in claim 18, wherein said collar portion extends beyond a circumference of the insert portion as well as beyond a circumference of the box portion in a direction transverse to a longitudinal axis passing through said collar portion, box portion, and insert portion.

20. The apparatus recited in claim 18, wherein said collar portion comprises cut-outs in the area of the termination ends of the contact elements, a sufficient collar width remaining so as to guarantee a safe sealing effect.

21. The apparatus recited in claim 18, wherein the contact elements are injection molded and biased to thereby improve the stability of the apparatus.

22. The apparatus recited in claim 18, wherein a free end is glued to an upper surface of said printed circuit board and said support surface of the collar portion is glued to a housing containing the chipcard.

23. The apparatus recited in claim 18, wherein the contacting apparatus is electrically and mechanically connected to the printed circuit board by means of solder.

24. The apparatus recited in claim 18, wherein the box portion includes a plurality of sidewalls which extend parallel to a longitudinal axis passing through said collar portion, box portion, and insert portion.

25. The apparatus recited in claim 24, wherein said sidewalls extend upwardly to a length equal to or larger than a thickness of the upper surface of the insert portion.

26. An apparatus for establishing electrical connection between a chipcard and a printed circuit board, said apparatus comprising:

means, arranged on said circuit board, for contacting said chipcard, said means including a support containing a plurality of contact elements for facilitating electrical contact between said chipcard and said printed circuit board, said support having dimensions which are smaller than dimensions of the chipcard so as to increase available space on said printed circuit board, wherein said support has a width which is narrower than the width of the chip card and said support further comprises a parallelogram-shaped section and a rectangular-shaped section wherein the sides of the support in the parallelogram-shaped section are inclined with respect to the sides of the support in the rectangular section.

27. The apparatus recited in claim 26, wherein the support includes two sections, a first section having substantially the shape of a rectangle and a second section having substantially the shape of a parallelogram.

28. The apparatus recited in claim 26, wherein the support has a width which is narrower than a width of the chipcard, said contact support tapering like a wedge on opposite sides.

29. The apparatus recited in claim 26, wherein the chipcard is a SIM card.

30. The apparatus recited in claim 26, further comprising:

a housing, disposed above said support, onto which is arranged on a bottom side thereof the chipcard; and wherein guide means are mounted on the housing independently of the support.

31. The apparatus recited in claim 30, further comprising:

a reinforcement means formed integrally with said support for increasing mechanical and thermal stability of said support, said reinforcement means being formed by metal inserts.

32. The apparatus recited in claim 30, further comprising:

a collar, extending about the contacting apparatus, for providing sealing between the housing and the contacting apparatus, and a continuous planar support provided at an axial end of the contacting apparatus which is opposite to an end of the contacting apparatus where the contact elements protrude for contacting the chipcard, said planar support forming a seal between the contacting apparatus and said printed circuit board.

\* \* \* \* \*